(12) United States Patent
Uchida et al.

(10) Patent No.: US 6,369,528 B1
(45) Date of Patent: Apr. 9, 2002

(54) VERTICAL DEFLECTION CIRCUIT (75) Inventors: Yukio Uchida, Ibaraki; Mitsuya Masuda, Takatsuki, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/197,177

(22) Filed: Nov. 20, 1998

(30) Foreign Application Priority Data

Dec. 25, 1997 (JP) ............................................. 9-357598

(51) Int. Cl.[7] .................................................. G09G 1/04
(52) U.S. Cl. ........................................ 315/389; 315/403
(58) Field of Search ............................ 315/389, 368.11, 315/368.18, 368.19, 368.28, 387, 399, 403; 348/380

(56) References Cited

U.S. PATENT DOCUMENTS

| | | | | |
|---|---|---|---|---|
| 4,719,391 A | * | 1/1988 | Maruta | 315/368 |
| 5,523,658 A | * | 6/1996 | Fukuma et al. | 315/368.19 |
| 5,537,149 A | * | 7/1996 | Teroka et al. | 348/556 |
| 5,956,099 A | * | 9/1999 | Watanabe | 348/805 |
| 6,054,898 A | * | 4/2000 | Okuma et al. | 330/266 |

FOREIGN PATENT DOCUMENTS

| JP | 40722694 A | * | 8/1995 |
|---|---|---|---|
| JP | 8-102270 | | 4/1996 |

* cited by examiner

*Primary Examiner*—Constantine Hannaher
*Assistant Examiner*—Shun Lee
(74) *Attorney, Agent, or Firm*—Pearne & Gordon LLP (57) ABSTRACT

A vertical linearity correction circuit including diodes and resistors is provided in a vertical deflection circuit, and a vertical deflection voltage applied to a vertical deflection yoke is corrected so as to follow a change in input impedance of the vertical deflection yoke. As a result, the vertical deflection speed in the vicinity of the central part of the image plane of the color picture tube is prevented from decreasing.

7 Claims, 8 Drawing Sheets

VERTICAL DEFLECTION CIRCUIT

BACKGROUND OF THE INVENTION

The present invention relates to a vertical deflection circuit of a cathode-ray tube for use in televisions and display monitors.

In an in-line color picture tube for use in televisions and display monitors, the central axis of the vertical deflection magnetic field of the deflection yoke sometimes may deviate from the central axis of the color picture tube, or the vertical deflection magnetic field sometimes may make rotative deviation with respect to the central axis the color picture tube. In the above-mentioned deviated states, the electron beam is not completely converged in the upper and lower parts of the image plane of the color picture tube, so that mis-convergence occurs in these parts.

Japanese Laid-open Patent Application No. Hei 8-102270 discloses to provide two auxiliary coils on the electron gun side of the deflection yoke in order to independently correct the mis-convergence in the upper and lower parts of the image plane. According to this prior art, a current corrected by a convergence correction circuit including a diode bridge circuit is fed through these auxiliary coils.

Figure 7:
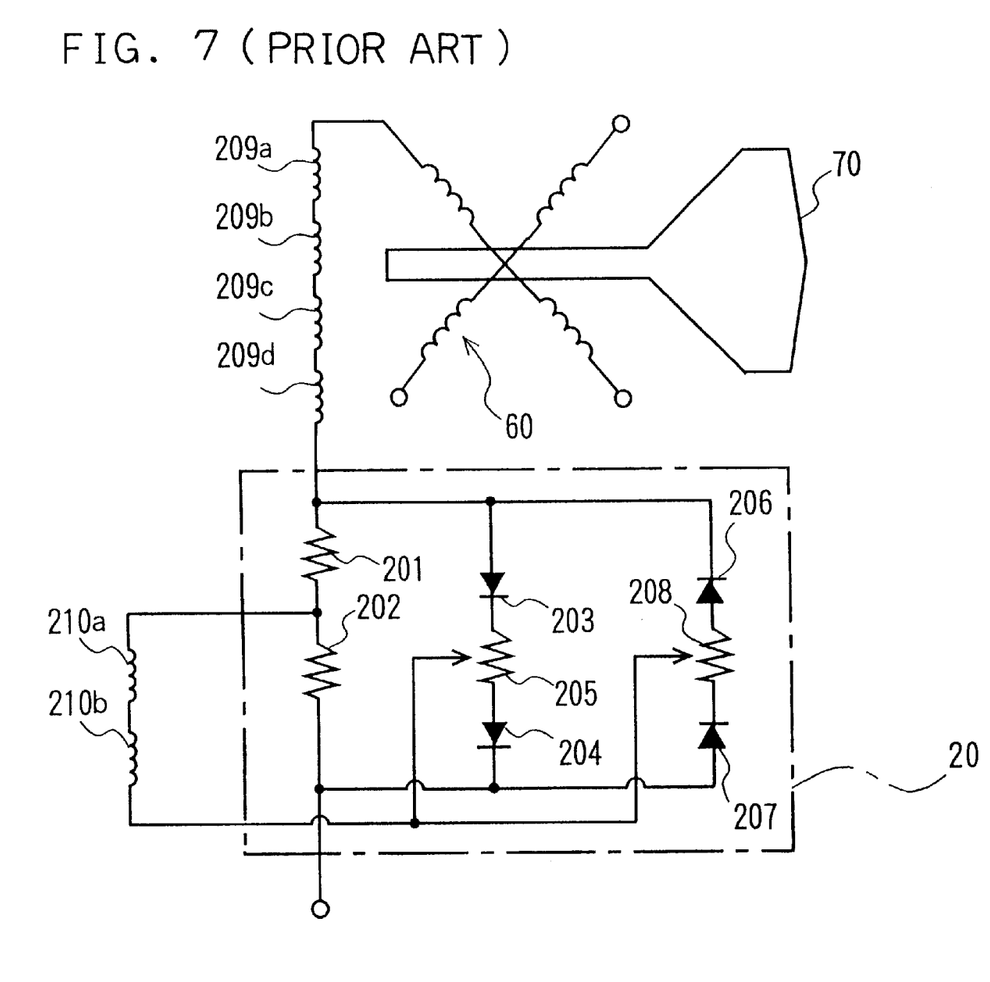
FIG. 7 is the circuit diagram of the vertical deflection yoke according to the prior art.
Figure 8:
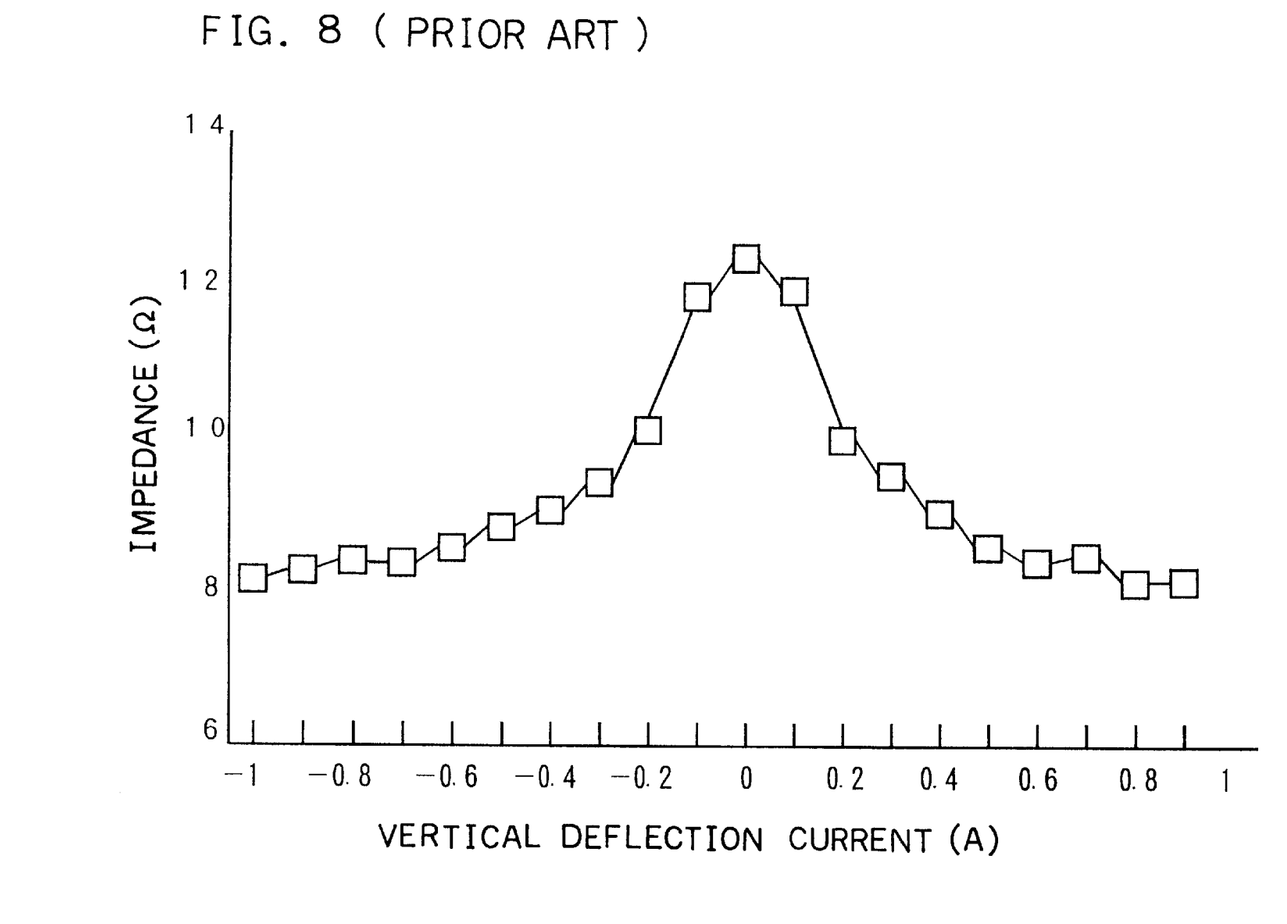
FIG. 8 is the view showing the relationship between the impedance and the deflection current of the typical vertical deflection coil.

FIG. 7 is a circuit diagram showing the convergence correction circuit 20 of the vertical deflection yoke according to the prior art. FIG. 8 is a view showing the impedance characteristic of the vertical deflection yoke.

The circuit diagram of FIG. 7 shows the vertical deflection yoke having a vertical deflection coil 60 attached to a color picture tube 70, the convergence correction circuit 20 constituting a part of a vertical deflection circuit, vertical coma aberration correction coils 209a, 209b, 209c and 209d, and auxiliary coils 210a and 210b provided on the above-mentioned electron gun side. The convergence correction circuit 20 has a first serially-coupled pair of resistors 201 and 202. A second serially-coupled group of a diode 203, a variable resistor 205 and a diode 204 of the same direction as that of the diode 203 is connected in parallel with the first serially-coupled pair. Further, a third serially-coupled group of a diode 206 of the opposite direction to that of the diode 203, a variable resistor 208 and a diode 207 of the same direction as that of the diode 206 is connected in parallel with the first serially-connected pair.

In the convergence correction circuit 20, as shown in FIG. 8, the impedance of the vertical deflection yoke steeply increases in the vicinity of the center of the vertical deflection range, that is, in the vicinity of where the vertical deflection current is zero, based on the voltage-current characteristics of the diodes 203, 204, 206 and 207. For this reason, the vertical deflection voltage supplied to the vertical deflection yoke cannot follow the change in impedance of the vertical deflection yoke. Therefore, the deflection speed of the electron beam in the vertical direction decreases in the vicinity of the center of the image plane of the color picture tube. Consequently, a density of horizontal scanning lines increases in the central part of the image plane, so that a horizontal belt-shaped high-luminance part appears in the vicinity of the vertical-direction center of the image plane. It is known that the belt-shaped high-luminance part appears when a correction circuit utilizing the voltage-current characteristics of diodes is added to the vertical deflection circuit.

An object of the present invention is to prevent the vertical deflection speed from decreasing in the vicinity of the center of the image plane of the color picture tube, and reduce the luminance of the horizontal belt-shaped high-luminance part when the impedance of the vertical deflection yoke steeply changes.

BRIEF SUMMARY OF THE INVENTION

A vertical deflection circuit of the present invention comprises: a vertical deflection voltage output circuit for supplying a vertical deflection voltage to a vertical deflection yoke of a cathode-ray tube; and a vertical linearity correction circuit for correcting the vertical deflection voltage supplied to the vertical deflection yoke so as to follow the change in input impedance of the vertical deflection yoke.

According to this configuration, the vertical deflection voltage corrected so as to follow the change in impedance of the vertical deflection yoke is supplied to the vertical deflection yoke. Consequently, the vertical deflection speed in the vicinity of the vertical-direction center of the image plane of the color picture tube is prevented from decreasing, so that the luminance of the horizontal belt-shape high-luminance part can-be reduced to a level that causes no problem in practical use.

In a vertical deflection circuit according to another aspect of the present invention, the above-mentioned vertical linearity correction circuit has negative-feedback circuits for correcting the output waveform of a vertical output amplifier in the vertical deflection voltage output circuit and feeding it back to the invert input of the vertical-output amplifier.

By the negative-feedback circuits, a corrected vertical deflection voltage that follows the change in impedance of the vertical deflection yoke is supplied to the vertical deflection yoke. Consequently, the vertical deflection speed in the vicinity of the vertical-direction center of the image plane of the color picture tube is prevented from decreasing, so that the luminance of the horizontal belt-shape high-luminance part can be reduced to a level that causes no problem in practical use.

In a vertical deflection circuit according to another aspect, the above-mentioned vertical linearity correction circuit has at least one diode and at least one resistor.

According to this configuration, by selecting the resistance value of the resistor, the vertical deflection yoke is supplied with a vertical deflection voltage appropriately corrected so as to follow the change in impedance of the vertical deflection yoke according to the voltage-current characteristic of the diode. Consequently, the vertical deflection speed in the vicinity of the vertical-direction center of the image plane of the color picture tube is prevented from decreasing, so that the luminance of the horizontal belt-shape high-luminance part can be reduced to a level that causes no problem in practical use.

In a vertical deflection circuit according to yet another aspect, the vertical linearity correction circuit has at least one first diode and at least one second diode connected in parallel with the first diode in the opposite direction.

The vertical deflection yoke is supplied with a vertical deflection voltage corrected so as to follow the change in impedance of the vertical deflection yoke according to the voltage-current characteristics of the two diodes operating on positive and negative vertical deflection voltages, respectively. Consequently, the vertical deflection speed in the vicinity of the vertical-direction center of the image plane of the color picture tube is prevented from decreasing. Therefore, the luminance of the horizontal belt-shape high-luminance part can be reduced to a level that causes no problem in practical use.

In a vertical deflection circuit according to still another aspect, the diodes constituting the vertical linearity correction circuit has substantially the same voltage-current characteristic as the diode of the convergence correction circuit provided in the vertical deflection yoke.

The diodes of the vertical linearity correction circuit can be switched between on and off in the same timing as the diode provided in the convergence correction circuit. Therefore a vertical deflection voltage corrected so as to follow in the same timing as it follows before the impedance characteristic of the deflection vertical yoke changes can be supplied to the vertical deflection yoke. Consequently, the vertical deflection speed in the vicinity of the vertical-direction center of the image plane of the color picture tube is prevented from decreasing, so that the luminance of the horizontal belt-shape high-luminance part can be reduced to a level that causes no problem in practical use.

In a vertical deflection circuit according to still another aspect, the resistor constituting the vertical linearity correction circuit has at least one first resistor connected in series with the diodes and at least one second resistor connected in parallel with the diodes.

The vertical deflection voltage supplied to the deflection yoke can be adjusted by the composite resistance value of the first resistor and the composite resistance value of the second resistor. Therefore a vertical deflection voltage appropriately corrected so as to follow the change in impedance of the vertical deflection yoke can be supplied to the vertical deflection yoke. Consequently, the vertical deflection speed in the vicinity of the vertical-direction center of the image plane of the color picture tube is prevented from decreasing, so that the luminance of the horizontal belt-shape high-luminance part can be reduced to a level that causes no problem in practical use.

In a vertical deflection circuit according to still another aspect, the resistor constituting the vertical linearity correction circuit is a variable resistor.

The vertical deflection voltage supplied to the vertical deflection yoke can be adjusted to an optimal value by adjusting the resistance value of the variable resistor. Therefore, a vertical deflection voltage appropriately corrected so as to follow the change in impedance of the vertical deflection yoke can be supplied to the vertical deflection yoke. Consequently, the vertical deflection speed in the vicinity of the vertical-direction center of the image plane of the color picture tube is prevented from decreasing, so that the luminance of the horizontal belt-shape high-luminance part can be reduced to a level that causes no problem in practical use.

In a vertical deflection circuit according to still another aspect, the diodes constituting the vertical linearity correction circuit are attached so that their temperatures are the same as that of the vertical output amplifier.

According to this configuration, the temperature conditions of the vertical output amplifier and the diodes of the vertical linearity correction unit can be made the same. Consequently, the vertical deflection circuit is not affected by change in on resistance value of the diodes due to the temperature characteristics of the diodes and the vertical deflection speed in the vicinity of the vertical-direction center of the image plane of the color picture tube is prevented from decreasing, so that the luminance of the horizontal belt-shape high-luminance part can be reduced to a level that causes no problem in practical use.

DETAILED DESCRIPTION OF THE INVENTION

Hereinafter, preferred embodiments of the present invention will be described with reference to FIG. 1 to FIG. 6.

[First Embodiment]

A vertical deflection circuit according to a first embodiment of the present invention will be described with reference to FIG. 1 to FIG. 4.

Figure 1:
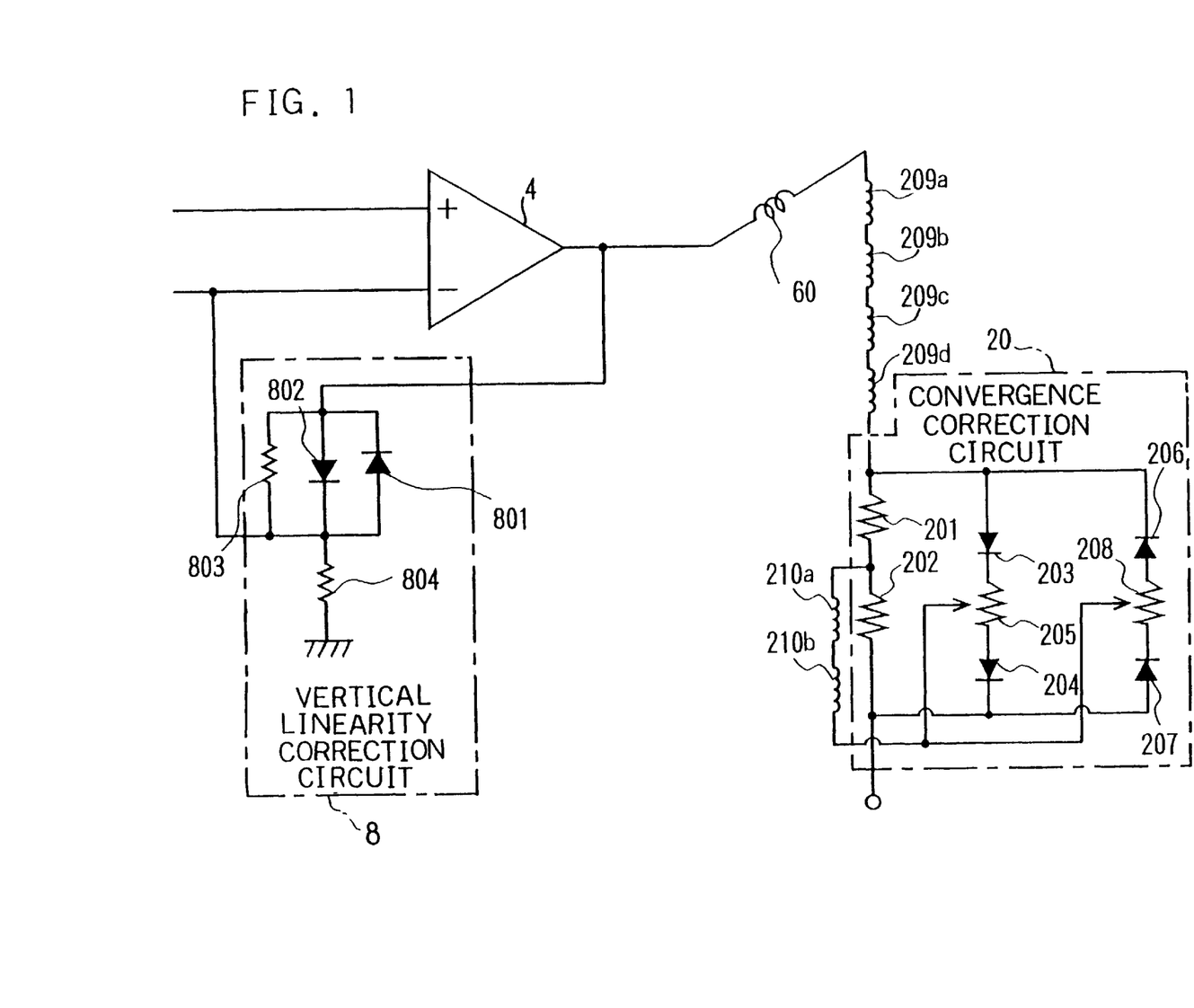
FIG. 1 is a circuit diagram showing a relevant part of a vertical deflection circuit according to a first embodiment of the present invention.

FIG. 1 is a circuit diagram showing a relevant part of the vertical deflection circuit of the present invention.

The vertical deflection circuit of FIG. 1 comprises a vertical output IC 4 which is an operational amplifier having a differential input terminal, and a vertical linearity correction unit 8 connected between the output terminal and the invert input terminal of the vertical output IC 4. One end of a vertical deflection coil 60 is connected to the output terminal of the vertical output IC 4. A convergence correction circuit 20 has the same configuration as the conventional convergence correction circuit of FIG. 7, and includes serially-connected vertical coma correction coils 209a, 209b, 209c and 209d and auxiliary coils 210a and 210b. The vertical linearity correction unit 8 includes a diode 801 and a diode 802 connected in parallel with the diode 801 in the opposite direction. A resistor 803 is connected in parallel with the diodes 801 and 802, and a resistor 804 is connected in series with the diodes 801 and 802.

The circuit of FIG. 1 has a negative-feedback circuit that corrects, by the vertical linearity correction unit 8, the voltage waveform output from the vertical output IC 4 connected to the vertical deflection coil 60 and feeds it back to the invert input of the vertical output IC 4. The operation of the vertical deflection circuit including the negative-feedback circuit will be described in detail with reference to FIG. 2 to FIG. 4.

Figure 2:
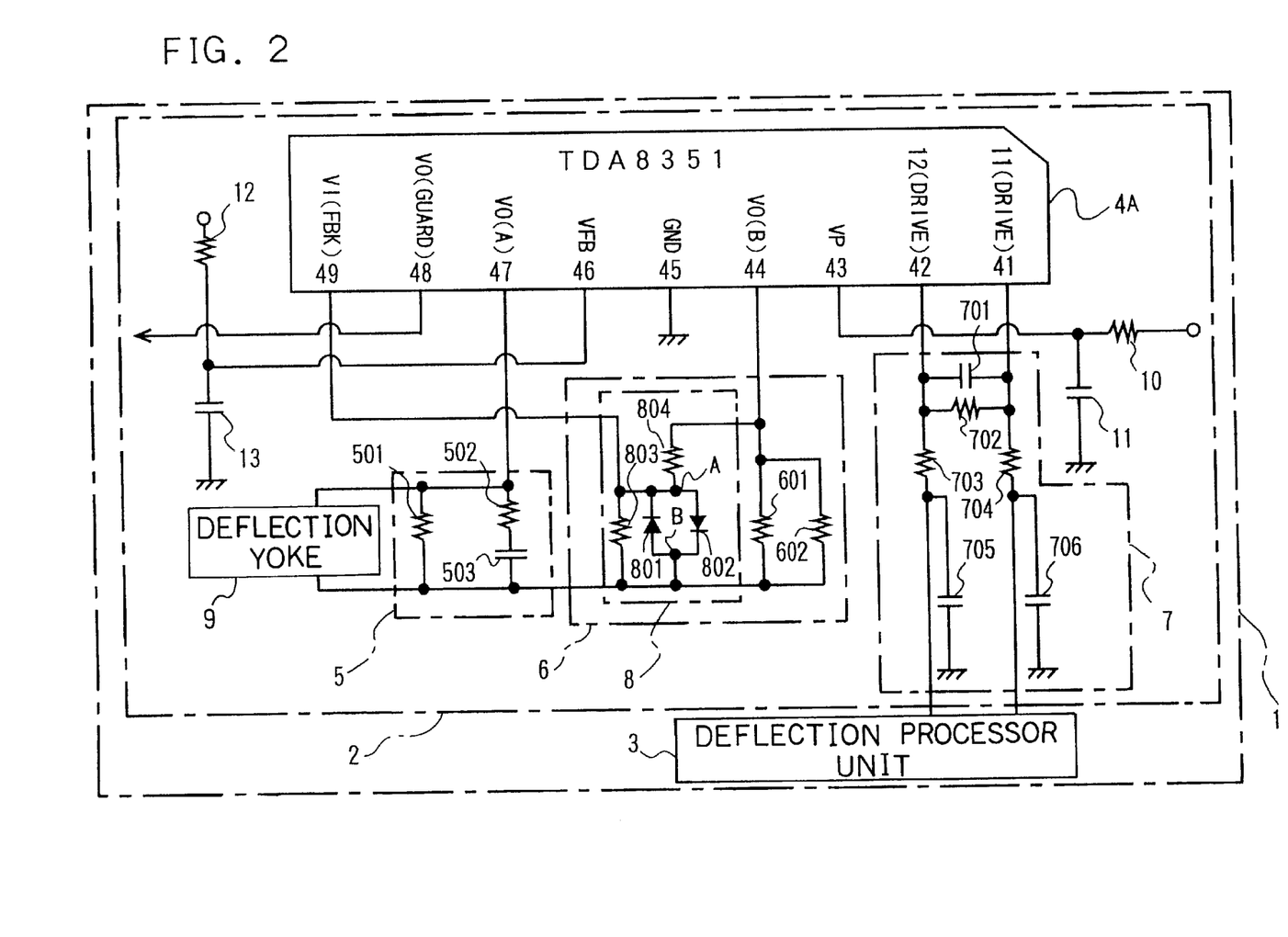
FIG. 2 is a circuit diagram showing a concrete example of the vertical deflection circuit according to the first embodiment.

FIG. 2 is a circuit diagram showing a concrete example of the vertical deflection circuit. In FIG. 2, a vertical deflection circuit 1 has a deflection processor unit 3 and a vertical output unit 2. The vertical output unit 2 includes a vertical output IC 4A corresponding to the vertical output IC 4 of FIG. 1, a vertical deflection yoke 9, a damping circuit unit 5, an input unit 7, a feedback circuit unit 6, resistors 10 and 12, and capacitors 11 and 13. The damping circuit unit 5 includes a serially-coupled pair of resistor 502 and capacitor 503, and a resistor 501 connected in parallel with the serially-coupled pair. The feedback circuit unit 6 includes a vertical linearity correction unit 8 having the same configuration as that of FIG. 1, and resistors 601 and 602 connected in parallel with the vertical linearity correction unit 8 for converting a vertical deflection current into a voltage. The input unit 7 has a capacitor 701 and a resistor 702 connected in parallel. One end of the resistor 702 is connected to one input terminal of the deflection processor unit 3 through the resistor 703. The other end of the resistor 702 is connected to the other input terminal of the deflection processor unit 3 through the resistor 704. Capacitors 705 and 706 are connected between the input terminals of the deflection processor unit 3 and the circuit ground GND. As the vertical output IC 4A, for example, an operational amplifier TDA8351 manufactured by Philips can be used. TDA4861 manufactured by the same company can also be used. A VO(A) terminal 47 corresponds to the output terminal of the vertical output IC 4. A VI(FBK) terminal 49 is the negative-feedback input terminal. A VO(B) terminal 44 is an output terminal connected with the ground as the negative power source. The vertical deflection yoke 9 shown in FIG. 2 includes the vertical deflection coil 60, the convergence correction circuit 20, the vertical coma correction coils 209a, 209b, 209c, and 209d and the auxiliary coils 210a and 210b of FIG. 1.

Figure 3:
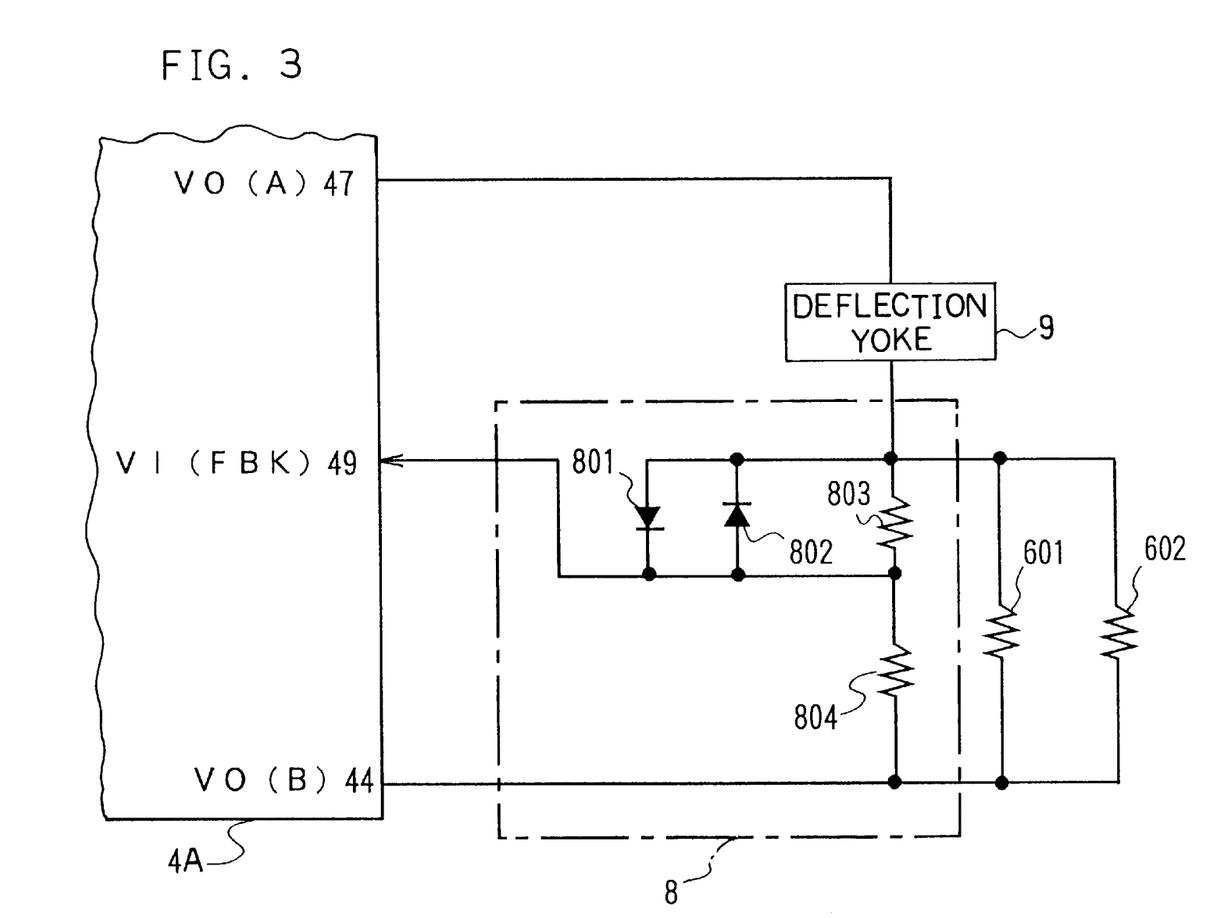
FIG. 3 is a circuit diagram showing connection between a vertical linearity correction unit and a vertical deflection yoke in the first embodiment.
Figure 4:
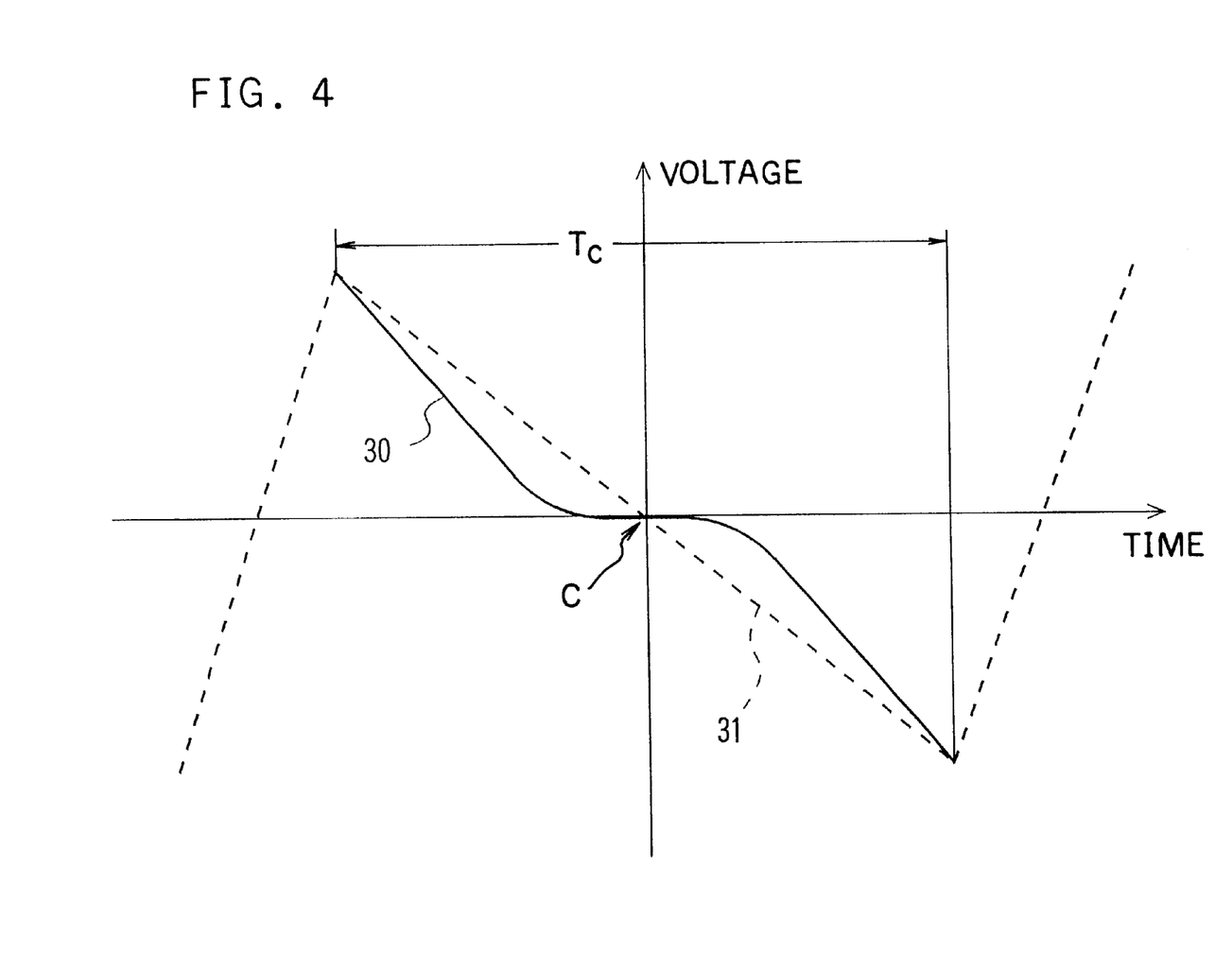
FIG. 4 is a view showing change of a feedback voltage.

FIG. 3 shows a relevant part of the vertical output IC 4A including the vertical linearity correction unit 8. In FIG. 3, when a vertical deflection voltage is applied to the diodes 801 and 802 of the vertical linearity correction unit 8, a feedback voltage 30 (the solid line of FIG. 4) that becomes substantially zero in the vicinity of the center C of the vertical deflection period as shown in FIG. 4 is created owing to the voltage-current characteristics of the diodes 801 and 802. The dotted line of FIG. 4 represents an input voltage 31 of the vertical output IC 4A. The feedback voltage 30 is applied to the VI(FBK) terminal 49 of the vertical output IC 4A. That is, the feedback voltage 30 is lower than the input voltage 31 (the dotted line of FIG. 4) during the vertical deflection period Tc of the central part of the image plane of the color picture tube. Therefore, the feedback voltage 30 corrects the vertical deflection voltage so that the deflection current increases during the vertical deflection period Tc of the central part of the image plane. This increases the vertical deflection speed in the central part of the image plane, so that the linearity is improved. Consequently, the spacings between the scanning lines in the central part of the image plane are uniformized. As a result, the luminance of the horizontal belt-shape high-luminance part that appears in the central part of the image plane is reduced to a level that causes no problem in practical use.

The correction amount of the vertical deflection voltage is defined by the voltage division ratio at which the voltage between the VO(A) terminal 47 and the VO(B) terminal 44 of the vertical output IC 4A is divided. The voltage division ratio is given by the values of the resistors 803 and 804. When the resistance value of the resistor 803 is R1 and the resistance value of the resistor 804 is R2, a voltage division ratio A is given by the following expression (1):

$$A = R2/(R1+R2) \quad (1).$$

When the diode 801 or the diode 802 is on, no current flows through the resistor 803. Therefore, the feedback voltage to the VI(FBK) terminal 49 of the vertical output IC 4A depends only on the resistor 804. When the diodes 801 and 802 are in off state, the feedback voltage to the VI(FBK) terminal 49 of the vertical output IC 4A is given by the values of the resistors 803 and 804. As is apparent from the expression (1), when the resistance value R1 of the resistor 803 is increased, the voltage division ratio A decreases, so that the feedback voltage to the VI(FBK) terminal 49 of the vertical output IC 4A decreases. When the feedback voltage decreases, the vertical deflection voltage increases. On the other hand, when the resistance value R1 of the resistor 803 is reduced, the voltage division ratio increases, so that the feedback voltage to the VI(FBK) terminal 49 of the vertical output IC 4A increases. When the feedback voltage increases, the vertical deflection voltage decreases. Thus, by appropriately selecting the resistance values of the resistors 803 and 804, the vertical deflection voltage can be corrected to an optimal value. By optimally selecting the resistance values of the resistors 803 and 804, the luminance of the horizontal belt-shape high-luminance part that appears in the central part of the image plane of the color picture tube can be reduced. As preferred resistance values for the resistors correcting the vertical deflection voltage, in the case of the deflection yoke for 41-cm (17-inch) color picture tubes, the inductance of the vertical deflection coil is 6.36 mH and the impedance thereof is 8.18Ω, and when a peak to peak value of the vertical deflection current is 1.4 A, the resistance value of the resistor 803 is 2.7Ω and the resistance value of the resistor 804 is 10Ω.

It is preferable that the voltage-current characteristics of the diodes 801 and 802 are substantially the same as those of the diodes 203, 204, 206 and 207 used in the convergence correction circuit 20 of the deflection yoke 9. Then, the diodes 801 and 802 are switched on and off in accordance with the change in impedance characteristic of the vertical deflection yoke 9. Consequently, the vertical deflection voltage can be corrected in accordance with the change in impedance characteristic, so that the luminance of the undesirable horizontal belt-shape high-luminance part appearing in a central part with respect to the vertical direction of the image plane can be more effectively reduced.

[Second Embodiment]

A vertical-deflection circuit according to a second embodiment will be described with reference to FIG. 5.

Figure 5:
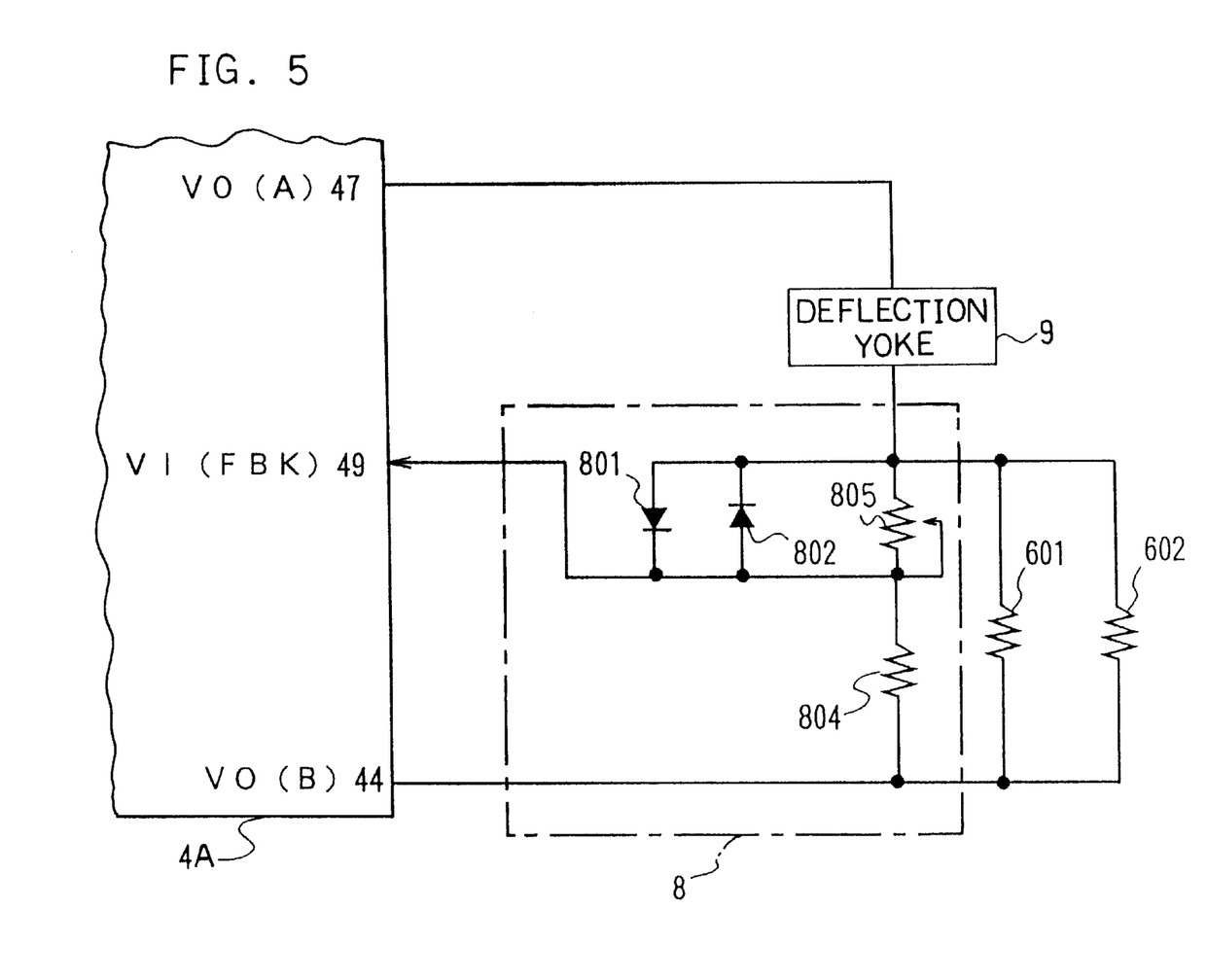
FIG. 5 is a circuit diagram showing connection between a vertical linearity correction unit and a vertical deflection yoke in a second embodiment.

FIG. 5 is a circuit diagram showing a relevant part of the vertical deflection circuit including the vertical linearity correction unit 8 according to the second embodiment. In this vertical deflection circuit, the resistor 803 of the first embodiment is replaced by a variable resistor 805. Other elements are the same as those of the first embodiment shown in FIG. 3 and will not be described again.

In the vertical deflection circuit of the second embodiment, the horizontal belt-shape high-luminance part appearing in the central part of the image plane can be eliminated by varying the resistance value of the resistor 805 while viewing the image plane of the color picture tube.

Therefore, in the vertical deflection circuit of the second embodiment, in addition to the effects of the first embodiment, by adjusting the resistance value of the variable resistor 805, the division ratio A can be corrected even when the voltage division ratio A of the resistors 803 and 804 varies due to nonuniformity among vertical deflection circuits or among deviation of characteristic of color picture tubes caused by errors in the manufacture.

In the second embodiment, the resistor 804 may be replaced by a variable resistor. Moreover, similar effects are obtained when the resistors 803 and 804 of the first embodiment are both replaced by variable resistors.

[Third Embodiment]

A third embodiment will be described by use of FIG. 6.

Figure 6:
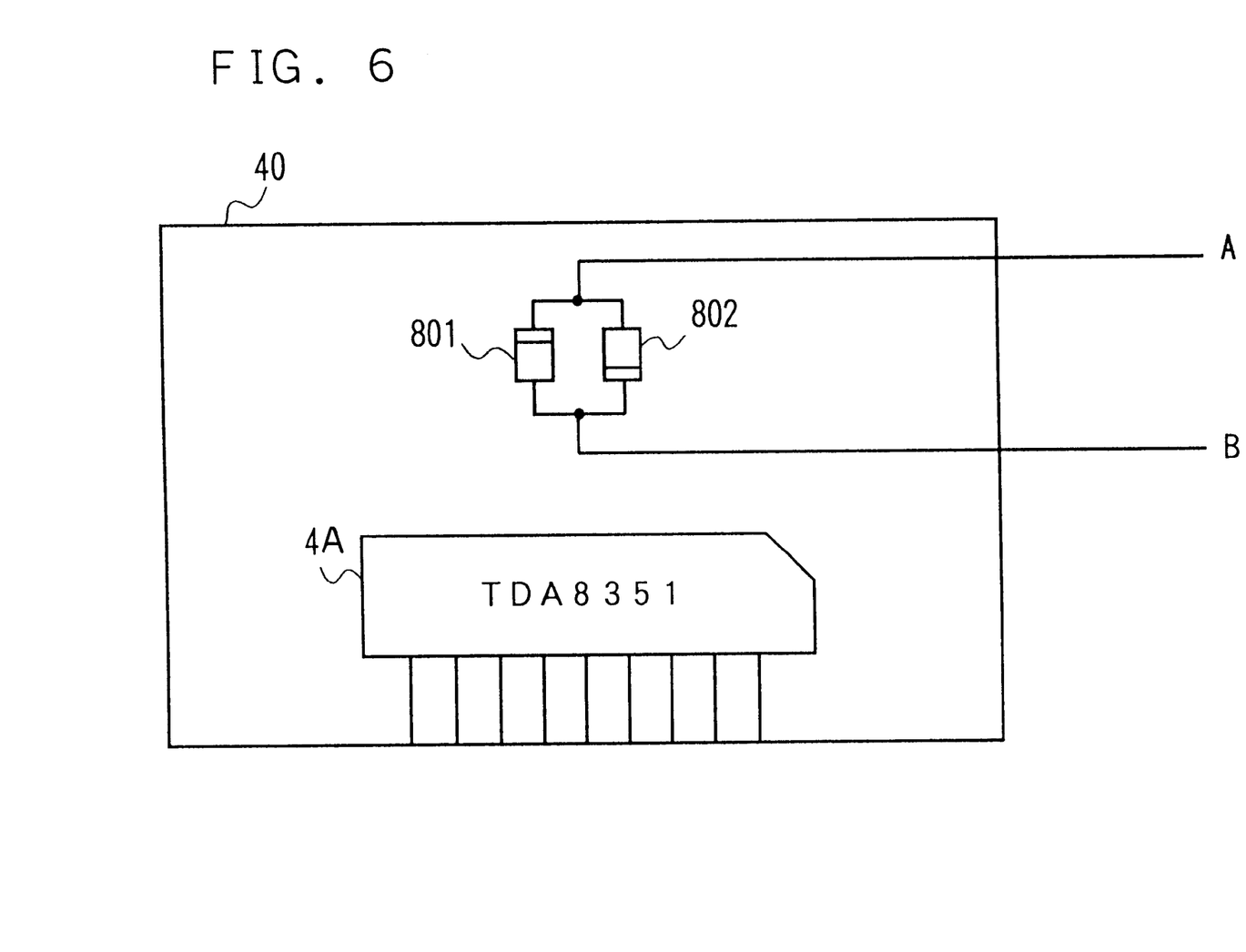
FIG. 6 is a view showing positions where diodes are attached in a third embodiment.

FIG. 6 is a plan view of a heat radiation board 40 on which the vertical output IC 4A and the diodes 801 and 802 are attached.

By thus attaching the diodes 801 and 802 so as to be in contact with the heat radiation board 40 to which the vertical output IC 4A is attached, the vertical output IC 4A and the diodes 801 and 802 can be set under substantially the same temperature condition. As a result, a vertical deflection circuit can be configured that is not affected by change in on resistance values of the diodes due to the temperature.

In the third embodiment, the diodes 801 and 802 may be attached to the case of the vertical output IC 4. The positions where the diodes 801 and 802 are disposed are not limited as long as the vertical output IC 4 and the diodes 801 and 802 can be set under substantially the same temperature condition.

While the present invention is applied to a vertical deflection circuit to which a convergence correction circuit is added in the above-described embodiments, similar effects are obtained when the present invention is applied to other correction circuits using the voltage-current characteristics of diodes.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A vertical deflection circuit comprising:
    a convergence correction circuit (20), including diodes (203, 204, 206, 207) and resistors (201, 202, 205, 208) connected in parallel, said convergence correction circuit being connected to a vertical deflection yoke (60) of a cathode-ray tube,
    a vertical deflection voltage output circuit including a vertical output amplifier connected at an output thereof to said vertical deflection yoke of said cathode-ray tube for supplying a vertical deflection voltage to said vertical deflection yoke; and
    a vertical linearity correction circuit for correcting said vertical deflection voltage supplied from said vertical deflection voltage output circuit to said vertical deflection yoke so as to follow a change in input impedance of said vertical deflection yoke including:
        a first diode (801);
        a second diode (802) connected in parallel in opposite direction with said first diode (801);
        a first resistor (803) connected in parallel with said first and second diodes, the parallel connection of the first diode, the second diode and the resistor having first and second nodes at the points of connection; and
        a second resistor (804) connected at the second node in series with the parallel connection of said first diode, said second diode and said first resistor, for feeding back an output voltage of said vertical output amplifier of said vertical deflection voltage output circuit to the invert input (−) of said vertical output amplifier for correcting said output voltage;
    wherein a voltage drop between the first node and the second node has a value that is independent of current.

2. A vertical deflection circuit in accordance with claim 1, wherein
    said vertical linearity correction circuit comprises at least one diode and at least one resistor connected in parallel.

3. A vertical deflection circuit in accordance with claim 2, wherein
    said vertical linearity correction circuit comprises at least two diodes connected in inverse parallel.

4. A vertical deflection circuit in accordance with claim 2, wherein
    said vertical linearity correction circuit comprises at least one first resistor connected in series with said at least one diode and at least one second resistor connected in parallel with said at least one diode.

5. A vertical deflection circuit in accordance with claim 2, wherein
    at least one of said at least one resistor of said vertical linearity correction circuit is a variable resistor.

6. A vertical deflection circuit comprising:
    a convergence correction circuit connected to a vertical deflection yoke of a cathode-ray tube, having parallelly-coupled groups of convergence correction diodes and resistors;
    a vertical deflection voltage amplification circuit for supplying a vertical deflection voltage to said vertical deflection yoke; and
    a vertical linearity correction circuit having:
        a first diode (801);
        a second diode (802) connected in parallel in opposite direction with said first diode (801);
        a first resistor (803) connected in parallel with said first and second diodes, the parallel connection of the first diode, the second diode and the resistor having first and second nodes at the points of connection; and
        a second resistor (804) connected at the second node in series with the parallel connection of said first diode, said second diode and said first resistor, said vertical linearity correction circuit feeding back an output of said vertical deflection voltage amplification circuit to the invert input (−) thereof;
    wherein a voltage drop between the first node and the second node has a value that is independent of current.

7. A vertical deflection circuit in accordance with claim 7, wherein
    said linearity correction diodes are attached to a package of an integrated circuit comprising a vertical output amplifier or to a heat radiation plate on which said vertical output amplifier is mounted so that the temperatures of said diodes become equal to that of said vertical output amplifier.

* * * * *

UNITED STATES PATENT AND TRADEMARK OFFICE
CERTIFICATE OF CORRECTION

PATENT NO. : 6,369,528 B1
DATED : April 9, 2002
INVENTOR(S) : Yukio Uchida et al.

It is certified that error appears in the above-identified patent and that said Letters Patent is hereby corrected as shown below:

Column 8,
Line 49, please delete "claim 7", and insert therefor -- claim 6 --.

Signed and Sealed this

Eighth Day of October, 2002

Attest:

Attesting Officer

JAMES E. ROGAN
Director of the United States Patent and Trademark Office